United States Patent
Genet

(10) Patent No.: US 9,580,048 B2
(45) Date of Patent: Feb. 28, 2017

(54) WINDSCREEN WIPER DEVICE

(75) Inventor: Sophie Genet, Saint Laurent sur Othain (FR)

(73) Assignee: Federal-Mogul S.A., Aubange (BE)

( * ) Notice: Subject to any disclaimer, the term of this patent is extended or adjusted under 35 U.S.C. 154(b) by 119 days.

(21) Appl. No.: 13/983,621

(22) PCT Filed: Feb. 3, 2011

(86) PCT No.: PCT/EP2011/051544
§ 371 (c)(1),
(2), (4) Date: Sep. 19, 2013

(87) PCT Pub. No.: WO2012/103947
PCT Pub. Date: Aug. 9, 2012

(65) Prior Publication Data
US 2014/0000057 A1    Jan. 2, 2014

(51) Int. Cl.
*B60S 1/38* (2006.01)
*B60S 1/40* (2006.01)

(52) U.S. Cl.
CPC .......... *B60S 1/4064* (2013.01); *B60S 1/3856* (2013.01); *B60S 1/3877* (2013.01); *B60S 1/4019* (2013.01); *B60S 1/3808* (2013.01); *B60S 1/3868* (2013.01)

(58) Field of Classification Search
CPC ..... B60S 1/3856; B60S 1/3877; B60S 1/3868
(Continued)

(56) References Cited

U.S. PATENT DOCUMENTS

2007/0113366 A1    5/2007    Walworth et al.
2009/0113653 A1*   5/2009    Thienard ................. B60S 1/386
                                                       15/250.32
(Continued)

FOREIGN PATENT DOCUMENTS

DE    19835065 A1    2/2000
DE    10259481 A1    7/2004
(Continued)

OTHER PUBLICATIONS

DE19835065A1 (machine translation), 2000.*
JP2005035340A (machine translation), 2005.*

*Primary Examiner* — Larry E Waggle, Jr.
*Assistant Examiner* — Andrew A Horton
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm can be pivotally connected to the connecting device about a pivot axis near one end, with the interposition of a joint part, with the special feature that the connecting device has a substantially H-shaped cross-section, wherein lower legs of the H-shaped cross-section are connected to the flexible material of the wiper blade on opposite sides thereof, and wherein upper legs of the H-shaped cross-section are adapted to receive the joint part.

9 Claims, 1 Drawing Sheet

Figure 1:
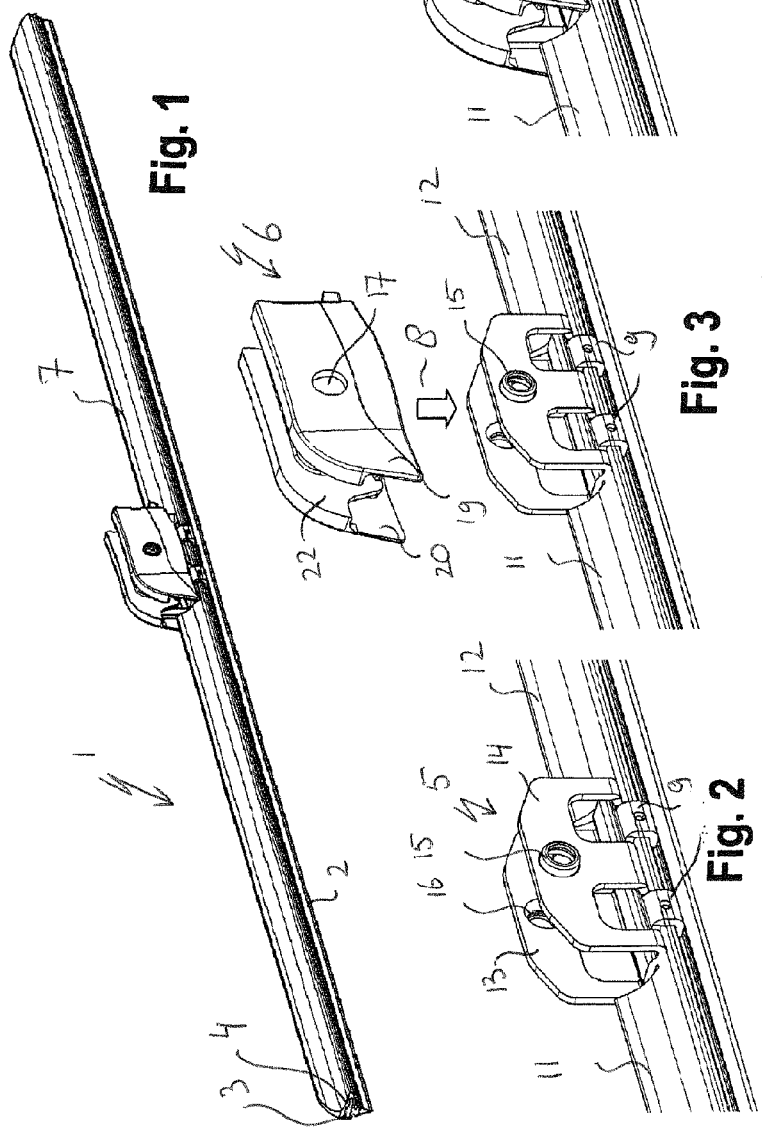

(58) Field of Classification Search
USPC ............ 15/250.32, 250.43–250.48, 250.201, 15/250.361
See application file for complete search history.

(56) References Cited

U.S. PATENT DOCUMENTS

| | | | |
|---|---|---|---|
| 2010/0000041 A1* | 1/2010 | Boland | ...................... 15/250.32 |
| 2010/0024149 A1* | 2/2010 | Erdal | ........................ 15/250.32 |
| 2011/0113583 A1 | 5/2011 | Shanmugham et al. | |
| 2012/0110772 A1* | 5/2012 | Boland | ...................... 15/250.32 |

FOREIGN PATENT DOCUMENTS

| | | | | |
|---|---|---|---|---|
| DE | 202008006383 U1 | 8/2008 | | |
| DE | 102008040063 A1 | 1/2010 | | |
| EP | 1795406 A1 * | 6/2007 | ................ | B60S 1/40 |
| EP | 1854685 A1 * | 11/2007 | ................ | B60S 1/40 |
| EP | 1876074 A1 | 1/2008 | | |
| EP | 2236366 A1 | 10/2010 | | |
| JP | 2005035340 A * | 2/2005 | .............. | B60S 1/386 |

\* cited by examiner

U.S. Patent　　　　Feb. 28, 2017　　　　US 9,580,048 B2

WINDSCREEN WIPER DEVICE

BACKGROUND OF THE INVENTION

1. Technical Field

The present invention refers to a windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm can be pivotally connected to the connecting device about a pivot axis near one end, with the interposition of a joint part.

2. Related Art

Such a windscreen wiper device is generally known. The prior art windscreen wiper device is in particular designed as a "yokeless" wiper device or "flat blade", wherein use is no longer made of several yokes pivotally connected to each other, but wherein the wiper blade is biassed by one or two longitudinal strip (s) of the carrier element, as a result of which it exhibits a specific curvature. According to the prior art one drawback of the prior art windscreen wiper device is the fact that the connecting device, also called "connector", lacks sufficient rigidity, not only at the location of its connection to the wiper blade, but also at the location of its connection to the oscillating arm. Hence, the connecting device may permanently deform under the influence of high stresses exerted thereon. As a result, the interconnection between the connecting device and the wiper blade, for example, may be adversely affected, so that the wiping properties may deteriorate, particularly at high speeds, due to the so-called "fish tailing phenomenon". According to this phenomenon the wiper blade on opposite sides of the connecting device vibrates in an uncontrollable manner parallel to the windscreen to be wiped. Hence, as a consequence thereof, wiping properties may seriously deteriorate, with all negative consequences involved.

SUMMARY OF THE INVENTION

The object of the invention is to improve the prior art as indicated above, in particular to provide a windscreen wiper device of the "flat blade" type, wherein the wiping properties are improved.

In order to accomplish that objective, a windscreen wiper device of the kind referred to in the introduction according to the invention is characterized in that the connecting device has a substantially H-shaped cross-section, wherein lower legs of the H-shaped cross-section are connected to the flexible material of the wiper blade on opposite sides thereof, and wherein upper legs of the H-shaped cross-section are arranged to receive the joint part. the H-shaped cross-section ensures a great rigidity of the connecting piece, allowing a shorter length thereof, seen in longitudinal direction of the wiper blade. A permanent or temporarily deformation due to high stresses loaded thereon is thus avoided. Particularly, the lower legs are movable between an open position, wherein the wiper blade can be placed inside the connecting device at the location of their interconnection, and a closed position, wherein the lower legs are clamped around the flexible material of the wiper blade. In the alternative, instead of a clamping operation, a crimping operation is used. the lower legs on the one hand and the upper legs on the other hand are interconnected by means of a base, wherein the lower legs, the upper legs and the base are preferably in one piece of material.

Please note that the joint part is preferably a separate, i.e. single constructional element being detachably connected to the connecting device, so that in that case there is a so-called "three piece connection" formed by the connecting device, the joint part and the oscillating arm. In the alternative, the joint part is an integral part of the oscillating arm. In that case there is a so-called "two piece connection" formed by the connecting device and the oscillating arm.

Further, it is noted that the interconnection of the connecting device and the wiper blade through a clamping action is efficiently dealt with in case the connecting device is made of metal.

In a preferred embodiment of a windscreen wiper device in accordance with the invention in the closed position the wiper blade and the longitudinal strip are mutually fixated by the lower legs at the location of the interconnection of the connecting device and the wiper blade, and wherein in the closed position the wiper blade is allowed to move in longitudinal direction relative to the longitudinal strip outside the location of the interconnection of the connecting device and the wiper blade. In other words, the wiper blade and the longitudinal strip are not allowed to mutually move under the connecting device, but in all other areas along the wiper blade a slight movement thereof is made possible in order to allow the wiper blade to follow any curvature of the windscreen to be wiped. In the closed position the lower legs are particularly slightly deforming the wiper blade at the location of the interconnection of the connecting device and the wiper blade.

In another preferred embodiment of a windscreen wiper device according to the invention the joint part is connected to the connecting device by engaging protrusions of the connecting device, at the location of the pivot axis, in co-axial recesses provided in the joint part. This is preferably realized through a snapping or clipping operation. In the alternative, the joint part is connected to the connecting device by engaging protrusions of the joint part, at the location of the pivot axis, in co-axial recesses provided in the connecting device. This is also particularly realized through snapping ("clipping"). More in particular, in the alternative, the protrusions extend inwards from outer walls of the joint part.

In another preferred embodiment of a windscreen wiper device in accordance with the invention the protrusions extend outwards from the upper legs on either side of the connecting device. the protrusions are preferably cylindrical. In the alternative, the protrusions are spherical or frusto-conical in shape. the protrusions that function as bearing surfaces, are thus spaced far apart, so that forces exerted thereon will be relatively low.

In another preferred embodiment of a windscreen wiper device according to the invention the protrusions are provided with co-axial through holes, wherein a pivot pin is inserted in the through holes. Accordingly, the wiper blade may then be connected to the oscillating arm on the basis of a so-called "sidelock system". The oscillating arm is provided with a joint pin or a pivot pin to be inserted in the co-axial through holes. the pivot pin protrudes in a direction towards the wiper blade and has a pivot axis extending in a direction of the oscillating movement of the oscillating arm.

In another preferred embodiment of a windscreen wiper device in accordance with the invention the connecting device is produced from a metal sheet and subsequently bend into the H-shaped cross-section. the connecting device is produced from a metal sheet particularly through a cutting or stamping operation.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade.

THE DRAWINGS

Figure 4:
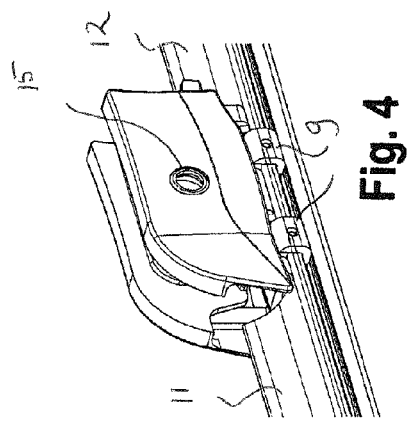
Figure 6:
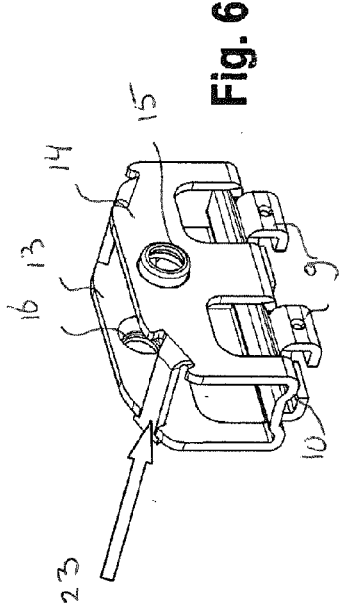
Figure 5:
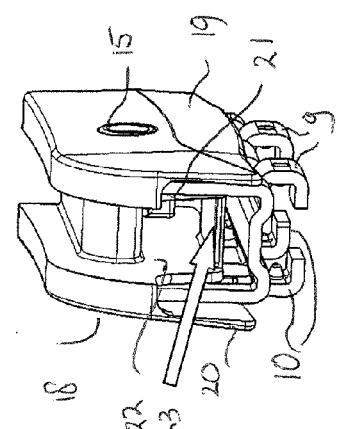

The invention will now be explained more in detail with reference to figures illustrated in a drawing, wherein FIG. 1 is a perspective, schematic view of a preferred embodiment of a windscreen wiper device according to the invention;

FIGS. 2 through 4 show stepwise mounting a joint part onto a connecting device of the windscreen wiper device of FIG. 1; and FIGS. 5 and 6 is a perspective, schematic view of the connecting device of FIGS. 1 through 4 with the joint part (FIG. 5) and without the joint part (FIG. 6) of FIGS. 3 and 4.

DETAILED DESCRIPTION

FIG. 1 shows a preferred variant of a windscreen wiper device 1 according to the invention. the windscreen wiper device 1 is built up of an elastomeric wiper blade 2 comprising a central longitudinal groove 3, wherein a longitudinal strip 4 made of spring band steel is fitted in the longitudinal groove 3. the strip 4 forms a flexible carrier element for the rubber wiper blade 2, as it were, which is thus biassed in a curved position (the curvature in operative position being that of a windscreen to be wiped). An end of the strip 4 and/or an end of the wiper blade 2 may connected on either side of the windscreen wiper device 1 to respective connecting pieces or "end caps" (not shown). The connecting pieces may be separate constructional elements, which may be form-locked as well as force-locked to both ends of the strip 4 and/or ends of the wiper blade 2. In another preferred variant, the connecting pieces may be in one piece with the strip 4 made of spring band steel. The windscreen wiper device 1 is furthermore built up of a connecting device or connector 5 of metal for connecting an oscillating wiper arm thereto (not shown), with the interposition of a joint part 6. The oscillating wiper arm is pivotally connected to the connecting device 5 about a pivot axis near one end. The preferred embodiment of FIG. 1 according to the invention comprises a spoiler or "air deflector" 7 which is made in one piece with the rubber wiper blade 2 and which extends along the entire length thereof.

Although not shown in FIG. 1, but fully understood by a skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device 5 moves the wiper blade 2.

In FIGS. 2, 3 and 4 a view is given of a part of the windscreen wiper device 1 of FIG. 1, showing (a) the connecting device 5 connected onto the wiper blade (2), but without the joint part 6 being mounted thereon (FIG. 2), (b) the connecting device 5 connected onto the wiper blade 2, but the joint part 6 being placed above the connecting device 5 in an attempt to mount the joint part 6 onto the connecting device 5 in the direction of arrow 8 (FIG. 3), and (c) the connecting device 5 connected onto the wiper blade 2 and the joint part 6 mounted onto the connecting device 5 (FIG. 4). FIGS. 2 and 6 show in detail the connecting device 5 used in the windscreen wiper device 1 of FIG. 1. As shown, the connecting device 5 has a H-shaped cross-section, wherein lower legs 9,10 of the H-shaped cross-section are connected to the rubber of the wiper blade 2 on opposite sides thereof. The spoiler 7 is an integral part of the wiper blade 2, while a central cut can be foreseen for placing the connecting device 5 therein. On opposite sides of the cut parts of the spoiler 7 are designated with reference numerals 11, 12. Upper legs 13,14 of the H-shaped cross-section are adapted to receive the joint part 6, as will be explained hereunder.

Whether or not with the help of a special tool or by hand the lower legs 9,10 are moved from a non operative position into an open position. In fact, the lower legs 9,10 are pushed outwardly against a spring force of the metal from which the connecting device 5 is manufactured. This is possible as a result of the elastic properties of the metal. In the open position the wiper blade 2 is mounted inside the lower legs 9,10 of the connecting device 5 at the location of their interconnection. In the open position the longitudinal strip 4 of the carrier element is slided into the central longitudinal groove 3 of the wiper blade 2. If considered expedient, a lubricant is used to facilitate insertion of the longitudinal strip 4 inside the longitudinal groove 3. Finally, when the wiper blade 2 and the longitudinal strip 4 are in the right position, the lower legs 9,10 of the connecting device 5 are allowed to spring back into a closed position (FIG. 2), wherein the lower legs 9,10 are clamped around the wiper blade 2, while slightly deforming the rubber of the wiper blade 2 at the location where the lower legs 9,10 engage the rubber. In the closed position the wiper blade 2 and the longitudinal strip 4 are mutually fixated by the lower legs 9,10 at the location of the interconnection of the connecting device 5 and the wiper blade 2, whereas in the closed position the wiper blade 2 is allowed to move in longitudinal direction relative to the longitudinal strip 4 outside the location of the interconnection of the connecting device 5 and the wiper blade 2.

As shown in FIGS. 1 through 6, the connecting device 5 comprises two cylindrical protrusions 15,16 extending outwards on either side of the upper legs 13,14 the connecting device 5. These protrusions 15,16 pivotally engage in identically shaped cylindrical recesses 17,18 in outer walls 19,20 of the plastic joint part 6. The protrusions 15,16 act as bearing surfaces at the location of the pivot axis in order to pivot the joint part 6 (and the oscillating arm attached thereto) about the pivot axis near one end of the oscillating arm. The protrusions 15,16 are preferably in one piece with the connecting device 5. In the alternative, the protrusions 15,16 are part of a single pivot pin perpendicular to the connecting device 5. The joint part 6 is mounted onto the connecting device 5 in the direction of the arrow 8 by snapping or clipping the joint part 6 onto the connecting device 5, wherein the outer walls 19,20 are elastically deformed. As can be seen in FIG. 5, the upper legs 13,14 of the connecting device 5 are accommodated between the outer walls 19,20 and inner walls 21,22 of the joint part 6 in order to increase the rigidity of the unit formed by the connecting device 5 and the joint part 6. The outer walls 19,20 and the inner walls 21,22 are thus spaced-apart defining a space there between for the upper legs 13,14.

To further increase the rigidity of the unit formed by the connecting device 5 and the joint part 6 the connecting device 5 may comprise a reinforcing rib 23 connecting the outer legs 13,14 so as to form a bridge between them.

As can be seen from the figures, the lower legs 9, 10 on the one hand and the upper legs 13, 14 on the other hand are interconnected through a base 24. Preferably, the lower legs 9, 10 and the upper legs 13, 14 and the base 24 are in one piece.

The invention is not restricted to the variants shown in the drawing, but it also extends to other preferred embodiments that fall within the scope of the appended claims.

The invention claimed is:

1. A windscreen wiper device comprising
an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed;
a connecting device for an oscillating arm which can be pivotally connected to said connecting device about a pivot axis near one end, with the interposition of a joint part,
wherein said connecting device is made as one integral and inseparable piece of a single material with a substantially H-shaped cross-section that has lower legs and upper legs,
wherein said lower legs are disposed in two longitudinally spaced apart sets and wherein said upper legs present a plurality of windows adjacent said lower legs,
wherein said lower legs of said H-shaped cross-section wrap around and directly contact a lower surface of the flexible material of said wiper blade on opposite sides thereof to connect the connecting device with the wiper blade,
wherein said upper legs present a pair of co-axially aligned and laterally outwardly extending protrusions which are cylindrically shaped,
wherein said cylindrical protrusions are positioned longitudinally between said windows and on solid wall portions of said upper legs for reinforcing said connecting device at said cylindrical protrusions,
wherein said joint part has outer walls disposed laterally outwardly of said upper legs of said connecting device,
wherein upper edges of said upper legs include chamfered areas adjacent a longitudinal front of said connecting device and adjacent a longitudinal back of said connecting device and wherein said joint part overlies said chamfered areas such that said chamfered areas increase a range of pivoting movement of said joint part relative to said connecting device,
wherein said protrusions are provided with co-axial through holes, and
wherein said joint part has two lateral sides each with an inner wall and said outer wall that straddle a respective one of said upper legs of said connecting device.

2. A windscreen wiper device according to claim 1, wherein said lower legs are movable between an open position, wherein said wiper blade can be placed inside said connecting device at the location of their interconnection, and a closed position, wherein said lower legs are clamped directly into the flexible material of said wiper blade.

3. A windscreen wiper device according to claim 2, wherein in said closed position said wiper blade and said longitudinal strip are mutually fixated by said lower legs at the location of the interconnection of said connecting device and said wiper blade, and wherein in said closed position said wiper blade is allowed to move in a longitudinal direction relative to said longitudinal strip outside the location of the interconnection of said connecting device and said wiper blade.

4. A windscreen wiper device according to claim 2, wherein in said closed position said lower legs are slightly deforming said wiper blade at the location of the interconnection of said connecting device and said wiper blade.

5. A windscreen wiper device according to claim 1, wherein said connecting device is produced from a metal sheet and subsequently bent into said H-shaped cross-section.

6. A windscreen wiper device according to claim 5, wherein said connecting device is produced from a metal sheet through a cutting or stamping operation.

7. A windscreen wiper device according to claim 1, wherein said joint part is a separate constructional element.

8. A windscreen wiper device according to claim 1, wherein said joint part is an integral part of said oscillating arm.

9. A windscreen wiper device as set forth in claim 1 wherein said joint part includes a top wall bridging said inner walls of said lateral sides and being recessed below a highest point of said inner walls.

* * * * *